United States Patent
Lee (10) Patent No.: US 8,645,719 B2
(45) Date of Patent: Feb. 4, 2014

(54) IMAGE PROCESSING APPARATUS AND CONTROL METHOD THEREOF

(75) Inventor: Jung-seob Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 251 days.

(21) Appl. No.: 12/620,116

(22) Filed: Nov. 17, 2009

(65) Prior Publication Data

US 2010/0125374 A1 May 20, 2010

(30) Foreign Application Priority Data

Nov. 20, 2008 (KR) .................. 10-2008-0115753

(51) Int. Cl.
| | |
|---|---|
| G06F 1/00 | (2006.01) |
| G06F 1/26 | (2006.01) |
| H02J 1/00 | (2006.01) |
| G06F 3/038 | (2013.01) |
| G06F 15/00 | (2006.01) |
| H04N 5/222 | (2006.01) |
| G05D 3/12 | (2006.01) |
| G01R 21/00 | (2006.01) |
| G06F 15/177 | (2006.01) |

(52) U.S. Cl.
USPC ............. 713/300; 713/320; 307/11; 345/204; 345/501; 348/333.13; 700/286; 702/60; 709/221

(58) Field of Classification Search
USPC ............. 713/300, 320; 307/11; 345/204, 501; 348/333.13; 700/386; 702/60; 709/221
See application file for complete search history.

(56) References Cited

U.S. PATENT DOCUMENTS

| | | | | |
|---|---|---|---|---|
| 7,139,920 | B2* | 11/2006 | Williams | 713/300 |
| 2001/0020940 | A1* | 9/2001 | Nakazato et al. | 345/418 |
| 2007/0139427 | A1* | 6/2007 | Sahashi | 345/561 |
| 2008/0246775 | A1* | 10/2008 | Fisher et al. | 345/589 |
| 2009/0213848 | A1 | 8/2009 | Jeon et al. | |
| 2009/0322723 | A1* | 12/2009 | Wu | 345/211 |
| 2011/0040785 | A1* | 2/2011 | Steenberg et al. | 707/769 |

FOREIGN PATENT DOCUMENTS

| | | |
|---|---|---|
| CN | 87213656 U | 11/1998 |
| CN | 101164285 A | 4/2008 |
| KR | 10-2007-0062006 A | 6/2007 |
| KR | 10-2007-0098172 A | 10/2007 |

OTHER PUBLICATIONS

Communication dated Feb. 26, 2013 issued by the State Intellectual Property Office of P.R. China in counterpart Chinese Application No. 200910224589.2.
Jeong, Youn-Kwae et al., "A network level power management for home network devices", IEEE Transactions on Consumer Electronics, v0154 (2): May 31, 2008, pp. 487-493.
Communication dated Nov. 12, 2013 issued by the State Intellectual Property Office of P.R. China in counterpart Chinese Patent Application No. 200910224589.2.

* cited by examiner

*Primary Examiner* — Stefan Stoynov
(74) *Attorney, Agent, or Firm* — Sughrue Mion, PLLC (57) ABSTRACT

Disclosed is an image processing apparatus including: an image processor which processes and displays an image signal; a communication unit which transmits a power consumption of the image processing apparatus to a power control server, and receives a message notifying necessary power saving function from the power control server; and a controller which controls the image processor to display a power load warning message and performs a power saving function in response to the power load warning message if the message notifying the necessary power saving function is received. With this, while operation rate of the power plant having high costs is lowered, low carbon emission of the plant may be achieved and a user of the image processing apparatus may reduce power consumption by performing a power saving function.

32 Claims, 8 Drawing Sheets

| IMAGE PROCESSING APPARATUS | POWER CONSUMPTION |
|---|---|
| 1 | POWER CONSUMPTION ≥ SECOND CRITICAL VALUE |
| 2 | POWER CONSUMPTION ≥ SECOND CRITICAL VALUE |
| 3 | POWER CONSUMPTION ≥ SECOND CRITICAL VALUE |
| 4 | POWER CONSUMPTION ≥ SECOND CRITICAL VALUE |
| 5 | POWER CONSUMPTION ≥ SECOND CRITICAL VALUE |
| 6 | POWER CONSUMPTION ≥ SECOND CRITICAL VALUE |
| 7 | POWER CONSUMPTION ≥ SECOND CRITICAL VALUE |
| 8 | POWER CONSUMPTION ≥ SECOND CRITICAL VALUE |
| 9 | POWER CONSUMPTION ≥ SECOND CRITICAL VALUE |
| 10 | POWER CONSUMPTION ≥ SECOND CRITICAL VALUE |
| TOTAL POWER CONSUMPTION (total) ≥ FIRST CRITICAL VALUE ||

FIG. 4B

| IMAGE PROCESSING APPARATUS | POWER CONSUMPTION |
|---|---|
| 1 | POWER CONSUMPTION ≥ SECOND CRITICAL VALUE |
| 2 | POWER CONSUMPTION ≥ SECOND CRITICAL VALUE |
| 3 | POWER CONSUMPTION ≥ SECOND CRITICAL VALUE |
| 4 | POWER CONSUMPTION ≥ SECOND CRITICAL VALUE |
| 5 | POWER CONSUMPTION ≥ SECOND CRITICAL VALUE |
| 6 | POWER CONSUMPTION ≥ SECOND CRITICAL VALUE |
| 7 | POWER CONSUMPTION < SECOND CRITICAL VALUE |
| 8 | POWER CONSUMPTION < SECOND CRITICAL VALUE |
| 9 | POWER CONSUMPTION < SECOND CRITICAL VALUE |
| 10 | POWER CONSUMPTION < SECOND CRITICAL VALUE |
| TOTAL POWER CONSUMPTION (total) ≥ FIRST CRITICAL VALUE | |

FIG. 6

IMAGE PROCESSING APPARATUS AND CONTROL METHOD THEREOF

CROSS-REFERENCE TO RELATED APPLICATION

This application claims priority from Korean Patent Application No. 10-2008-0115753, filed on Nov. 20, 2008, in the Korean Intellectual Property Office, the disclosure of which is incorporated herein by reference.

BACKGROUND OF THE INVENTION

1. Field of the Invention

Apparatuses and methods consistent with the present invention relate to an image processing and control thereof, and more particularly, to an image processing apparatus and a control method thereof which monitors a power consumption of the image processing apparatus connected to a large-scale network, and controls the image processing apparatus to perform a power saving function if power supplied to the network is overloaded.

2. Description of the Related Art

Generally, a digital TV which is used in households or a large format display (LFD) TV which is used for outdoor commercial advertisement is supplied power from a network. As digital TVs have become large-sized and supported high picture quality, their power consumption is on the rise. Accordingly, the network also increases power supply.

If power consumption of the network radically increases, power plants should operate further to supply additional power, causing huge costs and expenses. Accordingly, a more efficient method to adjust power consumption of the network is required in response to increasing power consumption.

SUMMARY OF THE INVENTION

Accordingly, it is an aspect of the present invention to provide an image processing apparatus and a control method thereof which monitors a power consumption of an image processing apparatus connected to a large-scale network, and controls performance of a power saving function of the image processing apparatus if power supplied to the network is overloaded.

Additional aspects of the present invention will be set forth in part in the description which follows and, in part, will be obvious from the description, or may be learned by practice of the present invention.

The foregoing and/or other aspects of the present invention are also achieved by providing an image processing apparatus including: an image processor which processes and displays an image signal; a communication unit which transmits a power consumption of the image processing apparatus to a power control server, and receives a message notifying necessary power saving function from the power control server; and a controller which controls the image processor to display a power load warning message and performs a power saving function in response to the power load warning message if the message notifying the necessary power saving function is received.

The controller may control the image processor to adjust at least one of brightness, resolution and sound of a displayed image if the power saving function is performed.

The controller may control the image processor to gradually lower the brightness or sound of the image.

The controller may do not perform the power saving function if the brightness or sound of the image is lower than a specific level.

The controller may control the image processor to output a message notifying a performance of the power saving function if the power saving function is performed.

The power consumption may include power consumed by a home network comprising the image processing apparatus.

The controller may control the image processing apparatus or electronic devices connected to the home network to perform a power saving function.

The image processing apparatus may further include a measuring unit which measures a power consumption of the image processing apparatus.

The controller may perform the power saving function depending on control information received from the power control server, may provide a user interface (UI) related to the power saving function and perform the power saving function according to a user's input received through the UI.

The power load warning message may include a warning message notifying a danger related to power supply or a warning message giving an advance notice that the power saving function is performed.

Another aspect of the present invention is achieved by providing a control method of an image processing apparatus, the control method including: transmitting power consumption information of the image processing apparatus to a power control server; displaying a power load warning message if a message requiring a power saving function is received from the power control server; performing the power saving function corresponding to the power load warning message; and processing and displaying an image signal.

If the power saving function may be performed, at least one of brightness, resolution and sound of a displayed image is controlled.

The brightness or sound of the image may be gradually lowered.

The power saving function may be not performed if the brightness or sound of the image is lower than a specific level.

If the power saving function may be performed, a message notifying a performance of the power saving function is output.

The power consumption may include power consumed by a home network comprising the image processing apparatus.

The image processing apparatus or electronic devices connected to the home network may be controlled to perform a power saving function.

The control method may further include measuring a power consumption of the image processing apparatus.

The control method may further include performing the power saving function depending on control information received from the power control server, providing a user interface (UI) related to the power saving function and performing the power saving function depending on a user's input received through the UI.

The power load warning message may include a warning message notifying a danger related to power supply or a warning message giving an advance notice to perform the power saving function.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
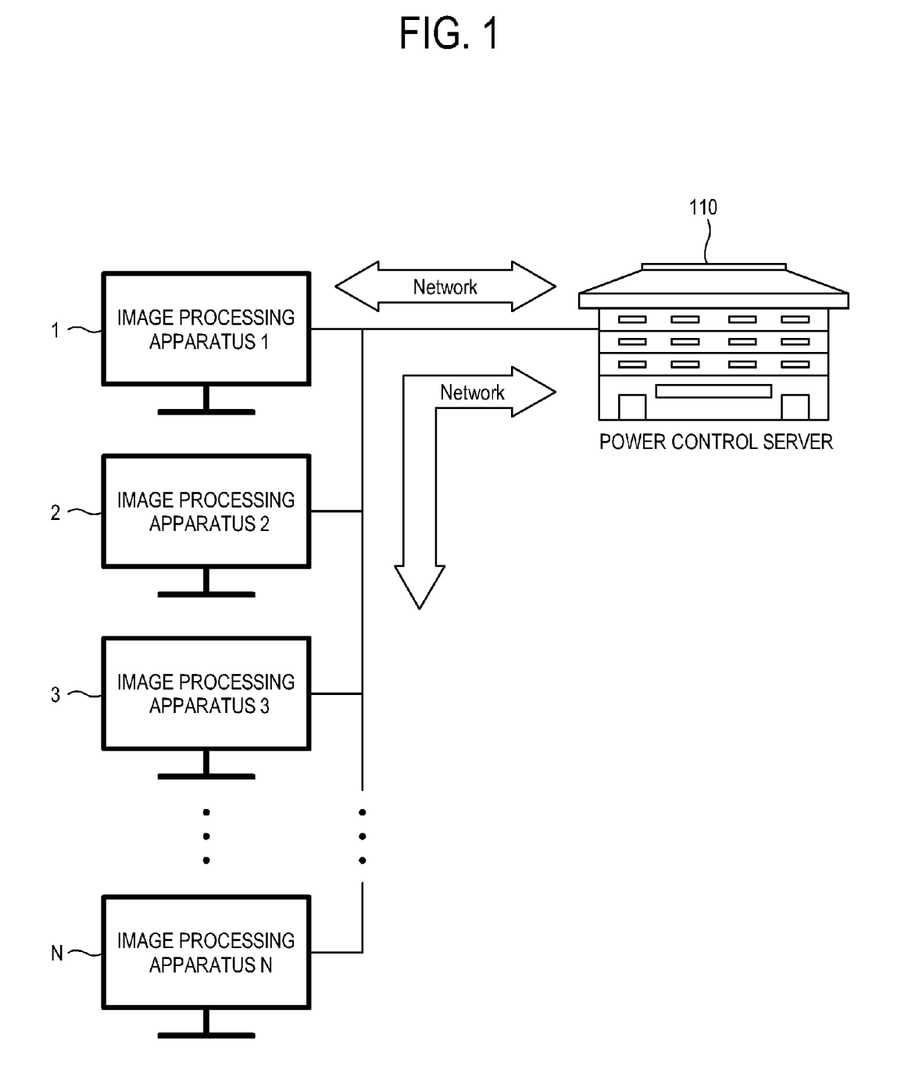
FIG. 1 illustrates a network including a power control server and an image processing apparatus according to an exemplary embodiment of the present invention.

FIG. 1 illustrates a network including a power control server and an image processing apparatus according to an exemplary embodiment of the present invention.

A power control server 110 controls a power consumption of an image processing apparatus depending on a power load of the network. In an exemplary embodiment, the power consumption is in watts. More specifically, the power control server 110 receives information about power consumption of a plurality of image processing apparatuses 1, 2, 3, . . . and N connected to a wired/wireless network. In this case, the power control server 110 monitors a total power consumption of the plurality of image processing apparatuses 1, 2, 3, . . . and N connected to the network (hereinafter, "total power consumption"), and controls the image processing apparatuses 1, 2, 3, . . . and N to perform a power saving function. For example, the power control server 110 may request the image processing apparatuses 1, 2, 3, . . . and N to display thereon a power load warning message.

The power load warning message may include a first warning message notifying, i.e., indicating, a danger related to power supply and a second warning message giving an advance notice to perform the power saving function. The image processing apparatuses 1, 2, 3, . . . and N may display thereon the first or second warning message and perform the power saving function if predetermined time elapses.

According to another exemplary embodiment, the power control server 110 may control the image processing apparatuses 1, 2, 3, . . . and N to perform the power saving function in consideration of not only total power consumption calculated by summing up power consumptions of each of the image processing apparatuses 1, 2, 3, . . . and N connected to the network but also a power supply capacity of a power supply source (not shown). For example, if power supply of the power supply source such as a power plant amounts to 90% of available power supply and if the total power consumption exceeds a critical value, the power control server 110 may control the image processing apparatuses 1, 2, 3, . . . and N to perform the power saving function.

Meanwhile, according to another exemplary embodiment, the power control server 110 may include or be disposed inside a power supply source that is located in a remote place. More specifically, the power supply source may include an electric power plant, e.g., a thermal power plant or a nuclear power plant which produces power, or a power transmission site or a substation which delivers power to consumers. The power control server 110 supplies power to the plurality of the image processing apparatuses 1, 2, 3, . . . and N connected to the network and controls the image processing apparatuses 1, 2, 3, . . . and N to perform the power saving function according to a load of the network.

The plurality of image processing apparatuses 1, 2, 3, . . . and N is supplied power from the power supply source.

The plurality of image processing apparatuses 1, 2, 3, . . . and N measures its own power consumption and transmits the measured consumption information to the power control server 110. The plurality of image processing apparatuses 1, 2, 3, . . . and N may perform the power saving function by a control of the power control server 110. For example, if receiving a request to display the first warning message notifying a danger related to power supply or the second warning message giving an advance notice to perform the power saving function, the power control server 110 may control the image processing apparatuses 1, 2, 3, . . . and N to display the first or second warning message and perform the power saving function after lapse of predetermined time. Otherwise, only the first message notifying the danger related to the power supply may be output and the power saving function may not be performed. While a user may perform the power saving function, the power saving function is not performed by a control of the power control server 110.

According to another exemplary embodiment, the image processing apparatuses 1, 2, 3, . . . and N may be connected with home appliances such as an air conditioner (not shown) or a refrigerator (not shown) through a home network, and obtain information about a total power consumption of a home network or a home, to which the home network belongs, to thereby transmit the consumption information to the power control server 110. If the power saving function is performed by a control of the power control server 110, the image processing apparatuses 1, 2, 3, . . . and N may gradually lower a cooling level of the refrigerator and the air conditioner connected to the image processing apparatuses 1, 2, 3, . . . and N through the home network.

Hereinafter, the power control server 110 and the image processing apparatuses 1, 2, 3, . . . and N according to the present invention will be described in detail.

Figure 2:
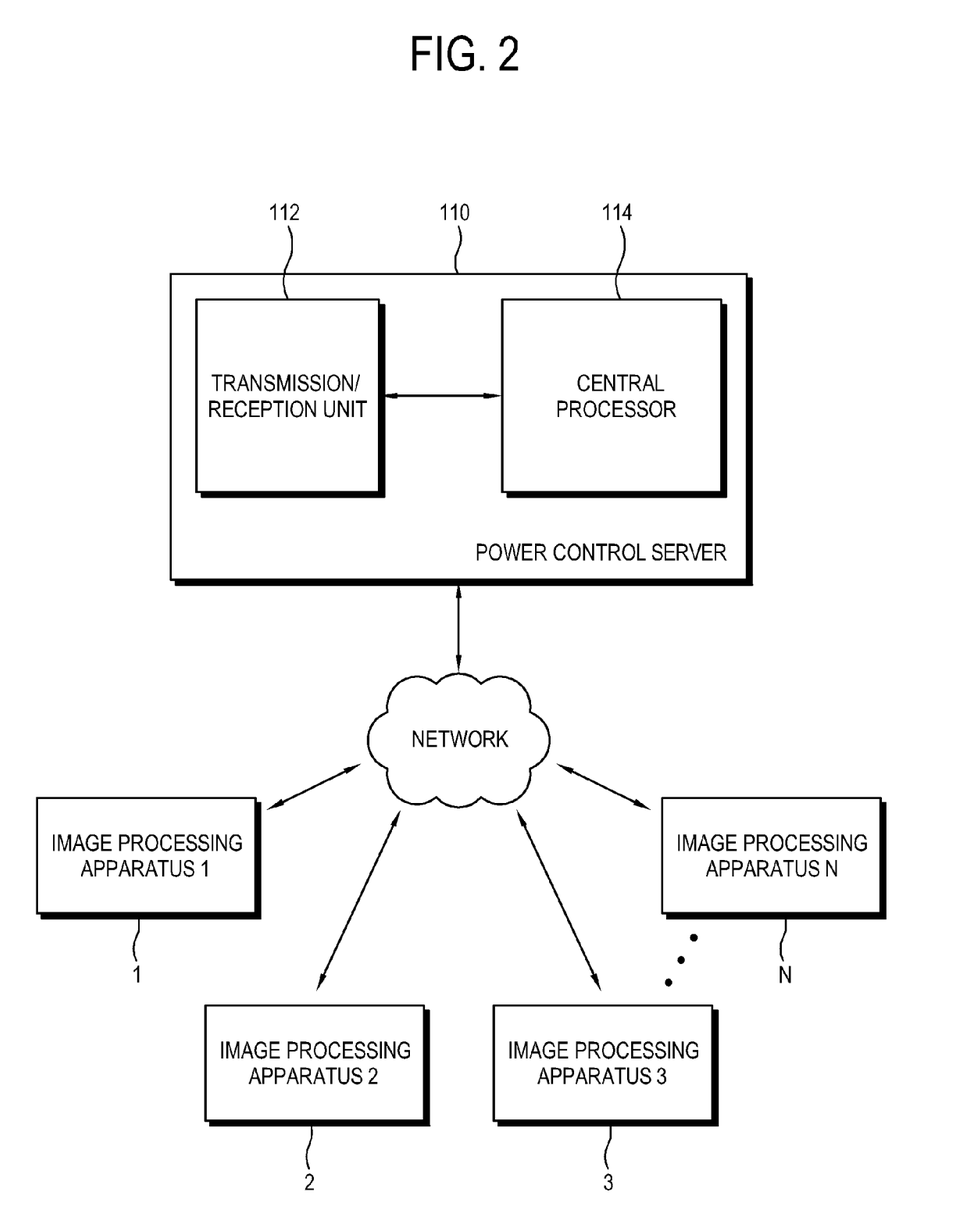
FIG. 2 illustrates the power control server according to the exemplary embodiment of the present invention.

FIG. 2 illustrates the power control server 110 according to the exemplary embodiment of the present invention.

The power control server 110 may include a transmission/reception unit 112 and a central processor 114.

The central processor 114 may calculate a total power consumption by summing up a power consumption of the plurality of image processing apparatuses 1, 2, 3, . . . and N, and control the image processing apparatuses 1, 2, 3, . . . and N to perform the power saving function if the total power consumption is a first critical value or more. The first critical value may be set by various standards. More specifically, an administrator of the power control server 110 may set the first critical value in consideration of the maximum power value available by the network, a power load of the network and the total power consumption.

According to the exemplary embodiment of the present invention, the central processor 114 may control the image processing apparatuses 1, 2, 3, . . . and N to perform the power saving function if the total power consumption is the first critical value or more, and selectively control the image processing apparatuses 1, 2, 3, . . . and N, whose power consumption is a second critical value or more.

More specifically, the second critical value may be set in consideration of minimum power required for normal operation of the image processing apparatuses 1, 2, 3, . . . and N. If the plurality of image processing apparatuses 1, 2, 3, . . . and N is controlled in a lump in consideration of the total power consumption of the network, the image processing apparatuses 1, 2, 3, . . . and N, whose power consumption is relatively small, also perform the power saving function. According to the exemplary embodiment of the present invention, the second critical value is set and the minimum amount of power required for normal operation of the image processing apparatuses 1, 2, 3, . . . and N is secured.

The transmission/reception unit 112 receives information about power consumption from each of the plurality of image processing apparatuses 1, 2, 3, . . . and N.

The transmission/reception unit 112 may request the plurality of image processing apparatuses 1, 2, 3, . . . and N to display thereon the first warning message notifying a danger related to power supply. The transmission/reception unit 112 may also request the plurality of image processing apparatuses 1, 2, 3, . . . and N to display thereon the second warning message giving an advance notice to perform the power saving function. The image processing apparatuses 1, 2, 3, . . . and N may then display thereon the first or second warning message and perform the power saving function after predetermined time elapses.

The transmission/reception unit 112 may transmit control information to each of the image processing apparatuses 1, 2, 3, . . . and N if the plurality of image processing apparatuses 1, 2, 3, . . . and N is controlled to perform the power saving function.

Figure 3:
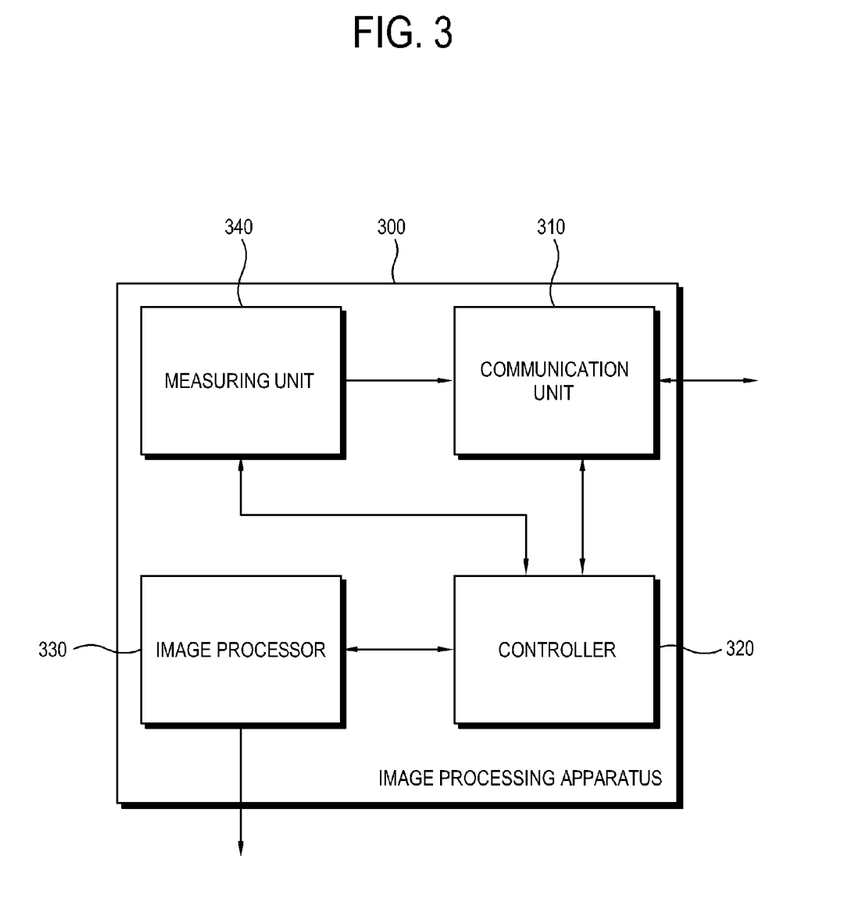
FIG. 3 illustrates the image processing apparatus according to the exemplary embodiment of the present invention.

FIG. 3 illustrates an image processing apparatus according to the exemplary embodiment of the present invention.

An image processing apparatus 300 according to the exemplary embodiment of the present invention may include a digital TV, a desktop computer, an air conditioner or other electronic devices. The image processing apparatus 300 may further include an electronic device as long as it receives power from a network.

The image processing apparatus 300 may include a communication unit 310, a controller 320, an image processor 330 and a measuring unit 340.

The communication unit 310 performs communication with a power control server 110 connected to a wired/wireless network. More specifically, the communication unit 310 transmits power consumption information of the image processing apparatus 300 to the power control server 110. The communication unit 310 may receive a request from the power control server 110 to output a first warning message notifying a danger related to power supply or a second warning message giving an advance notice to perform a power saving function.

The controller 320 performs the power saving function according to a control of the power control server 110. More specifically, the controller 320 may control the image processor 330 to control at least one of brightness, resolution and sound of a displayed image.

If the power saving function is performed by controlling brightness or sound of the image, the controller 320 may control the image processor 330 to lower the set brightness or sound. If the power saving function is performed by controlling resolution of the image, the controller 320 may control the image processor 330 to lower the resolution supported by the image processing apparatus 300. For example, if the image processing apparatus 300 supports full high definition (HD), the controller 320 lowers a resolution of a screen to HD. If the image processing apparatus 300 supports HD, the controller 320 lowers a resolution of a screen to a standard definition (SD).

A user may set a priority of factors to be controlled when the power saving function is performed. If a user sets the priority in the order of brightness, sound and resolution, the image processing apparatus 300 adjusts the brightness first if the power saving function is performed.

The controller 320 may control the image processor 330 to gradually lower brightness or sound of an image. More specifically, if the controller 320 controls brightness of the image, it may gradually lower brightness at a predetermined interval.

Further, the controller 320 may not perform the power saving function if the brightness of the image is lower than a specific level. The specific level is preferably set in consideration of a minimum brightness value generally required to display an image. If a user sets a relatively low brightness of the image processing apparatus 300, and if the brightness of the image is controlled to perform the power saving function, the brightness is excessively lowered. According to the exemplary embodiment of the present invention, if the brightness of the image is lower than the specific level, the image processing apparatus 300 does not perform the power saving function.

According to the exemplary embodiment of the present invention, the controller 320 may control the power saving function according to control information received from the power control server 110.

According to the exemplary embodiment of the present invention, the power saving function is controlled according to the control information received from the power control server 110. According to another exemplary embodiment of the present invention, however, the controller 320 may provide a user interface (UI) related to the power saving function, and control the power saving function according to a user's input received through the UI. For example, the controller 320 may provide a UI for a user to select the image processing apparatus 300 or electronic devices connected to a home network including the image processing apparatus 300. The controller 320 may provide a UI to select various power saving functions such as brightness reduction, cooling temperature reduction and heating temperature reduction with respect to the electronic devices and a reduction level thereof. The controller 320 may perform the power saving function according to a user's input received through the UI.

If the power saving function is performed, the controller 320 may control the image processor 330 to output a message notifying the performance of the power saving function.

The image processor 330 processes and displays an image signal. More specifically, the image processor 330 may adjust brightness or resolution of an output image, or scale an output image according to a screen. The image processor 330 may output a power load warning message received from the power control server 110 or a message notifying performance of the power saving function as an on screen display (OSD).

The image processor 330 may include a liquid crystal display (LCD), an organic light emitting diode (OLED) or a plasma display panel (PDP).

The measuring unit 340 measures a power consumption of the image processing apparatus 300. More specifically, the measuring unit 340 may measure a current value and a voltage value supplied to the image processing apparatus 300, and may calculate the power consumption from the measured values.

The measuring unit 340 may be integrally formed with the communication unit 310 or the controller 320.

According to another exemplary embodiment, the measuring unit 340 may collect a power consumption of the image processing apparatus 300 and all of electronic devices connected to a home network including the image processing apparatus, and calculate the power consumption. The measuring unit 340 may collect power consumption from a predetermined gauge (not shown) instead of measuring the power consumption on its own.

Figure 4A:
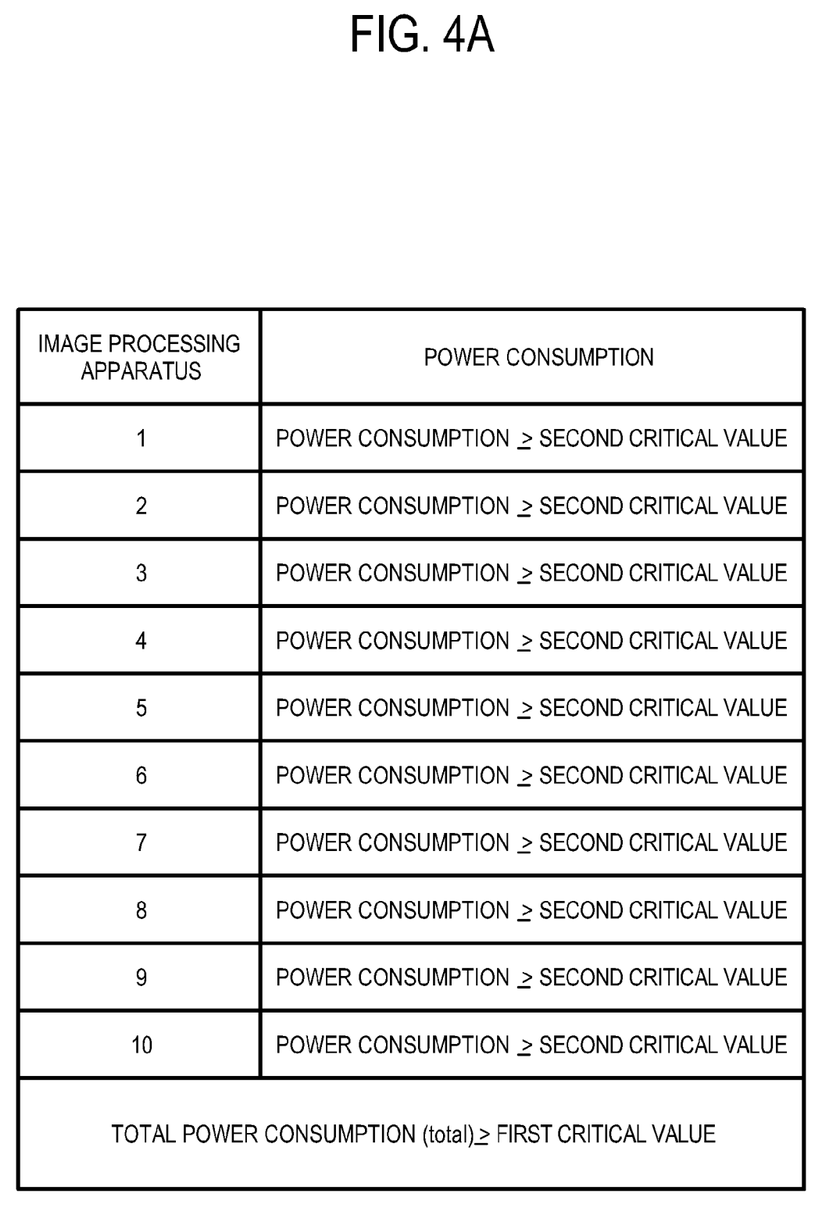
FIGS. 4A and 4B illustrate a power consumption and a total power consumption of a plurality of image processing apparatuses connected to the network according to the exemplary embodiment of the present invention.
Figure 4B:
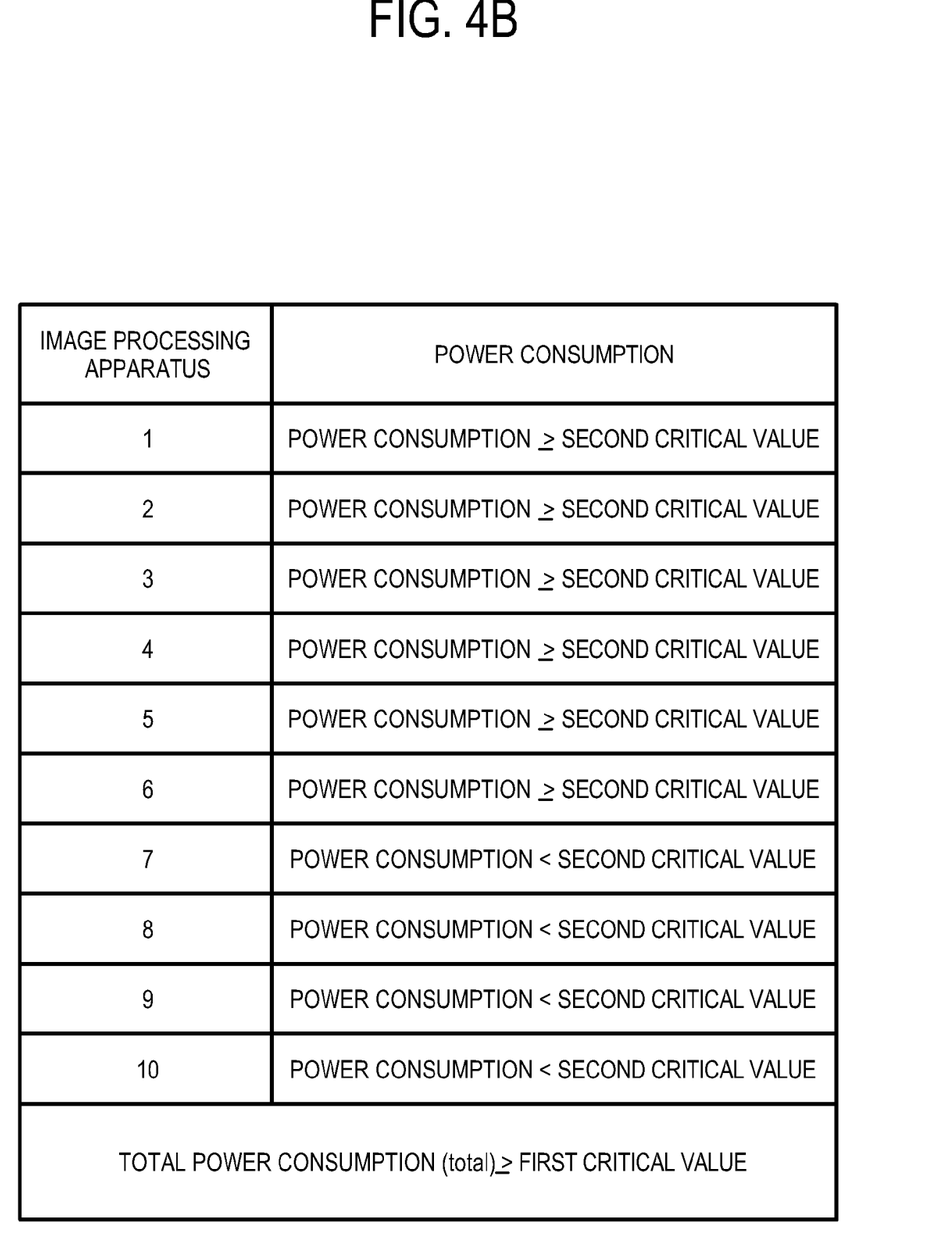

FIGS. 4A and 4B illustrate a power consumption of each of plurality of image processing apparatuses connected to the network and a total power consumption according to the exemplary embodiment of the present invention. Hereinafter, it is assumed that ten image processing apparatuses connected to the network are controlled.

In FIG. 4A, the total power consumption is a first critical value or more. Thus, the power control server 110 controls the image processing apparatuses connected to the network to perform the power saving function. As the power consumption of each of the image processing apparatuses is the second critical value or more, the power control server 110 controls all of ten image processing apparatuses connected to the network to perform the power saving function.

In FIG. 4B, the total power consumption is a first critical value or more. The power control server 110 controls the image processing apparatuses connected to the network to perform the power saving function. The power consumption of the image processing apparatuses 1 to 6 is the second critical value or more, but the power consumption of the image processing apparatuses 7 to 10 is below the second critical value. Thus, the power control server 110 controls the image processing apparatuses 1 to 6 to perform the power saving function.

Figure 5:
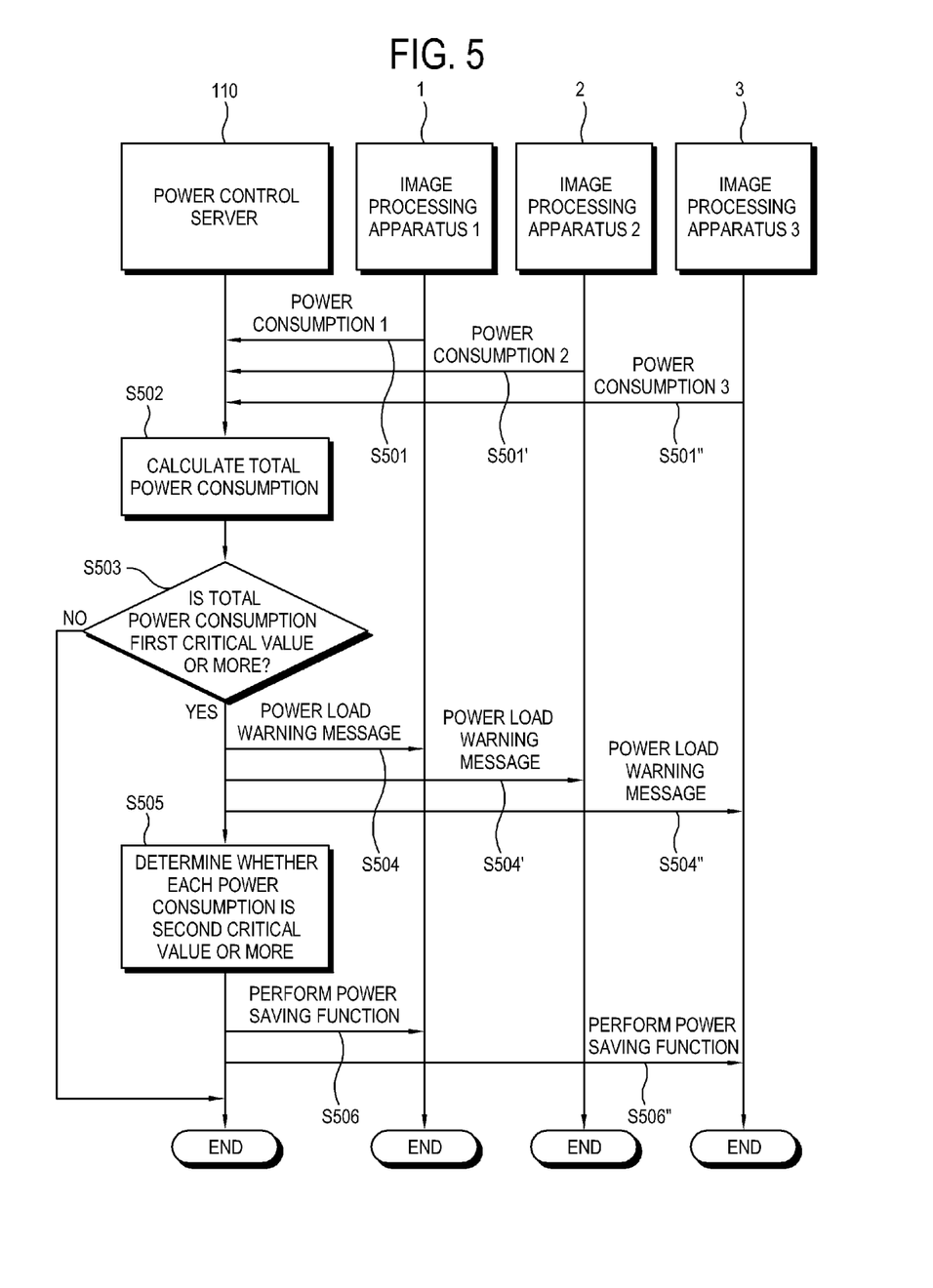
FIG. 5 is a flowchart of a control process of the power control server according to the exemplary embodiment of the present invention.

FIG. 5 is a flowchart of a control process of the power control server 110 according to the exemplary embodiment of the present invention.

In FIG. 5, it is assumed that the power control server 110 controls three image processing apparatuses 1, 2 and 3 connected through the network.

The power control server 110 receives power consumption from each of the image processing apparatuses 1, 2 and 3 (S501, S501' and S501"). The period during which the information about the power consumption is received may set in various ways. If it is determined that a power management is required, the power control server 110 may request each of the image processing apparatuses 1, 2 and 3 to report the power consumption.

The power control server 110 sums up the received power consumption 1, power consumption 2 and power consumption 3 to calculate the total power consumption (S502).

The power control server 110 determines whether the total power consumption is the first critical value or more (S503). If the total power consumption is below the first critical value, the power control server 110 determines that power supply of the network is not overloaded and ends the control process.

If the total power consumption is the first critical value or more, the power control server 110 requests each of the image processing apparatuses 1, 2 and 3 to output the power load warning message (S504, S504' and S504"). Then, the image processing apparatuses 1, 2 and 3 may acknowledge that power supplied from the network is overloaded.

The power control server 110 determines whether the power consumption of each of the image processing apparatuses 1, 2 and 3 is the second critical value or more (S505). The power control server 110 may control only the image processing apparatuses, whose power consumption is the second critical value or more, to perform the power saving function.

For example, if the power consumption of the image processing apparatus 2 is below the second critical value and if power consumption of the remaining image processing apparatuses is the second critical value or more, the power control server 110 may control the image processing apparatus 1 and the image processing apparatus 3 to perform the power saving function (S506 and S506"). Then, the control process of the power control server 110 is completed.

It is assumed that three image processing apparatuses are controlled in FIG. 5. However, the more the number of image processing apparatuses controlled by the power control server 110 is, the higher the power saving effect according to the present invention is. For example, if power of 10000 KV is to be saved, and if the controlled image processing apparatuses are 100 units, the image processing apparatuses should save 100 KV each. If the controlled image processing apparatuses are 10,000 units, the image processing apparatuses should save only 1 KV each. In the latter case, only small reduction in power consumption of the image processing apparatuses may lead to huge reduction in power consumption of the network as a whole.

Figure 6:
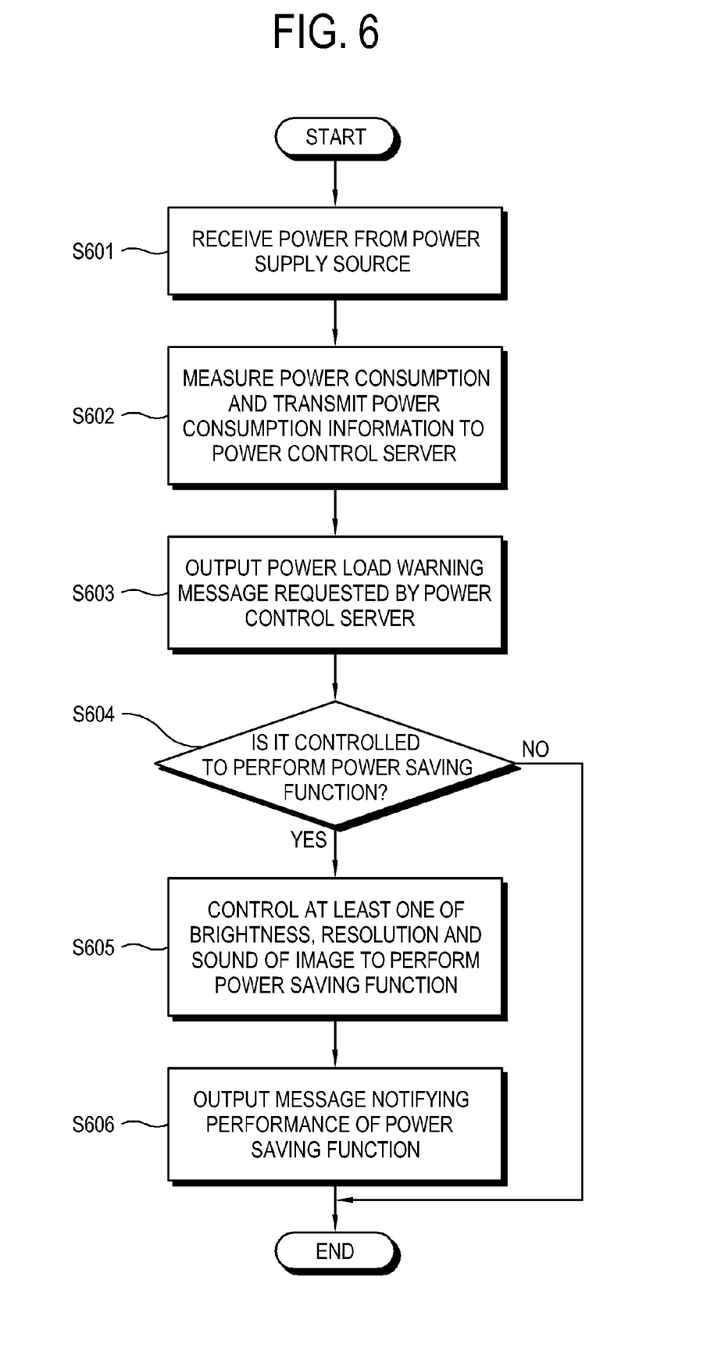
FIG. 6 is a flowchart of a control process of the image processing apparatus according to the exemplary embodiment of the present invention.

FIG. 6 is a flowchart of a control process of the image processing apparatus according to the exemplary embodiment of the present invention.

The image processing apparatus 300 is supplied power from the power supply source (S601). The image processing apparatus 300 measures its power consumption, and transmits the power consumption information to the power control server 110 (S602).

If the power control server 110 requests to output the power load warning message, the image processing apparatus 300 outputs the message to the screen (S603).

The image processing apparatus 300 determines whether it is controlled to perform the power saving function (S604). If it is controlled to perform the power saving function, the image processing apparatus 300 may control at least one of brightness, resolution and sound of the displayed image to perform the power saving function (S605). The image processing apparatus 300 may not perform the power saving function if the brightness of the image is lower than the specific level.

If the power saving function is performed, the image processing apparatus 300 outputs the message notifying the performance of the power saving function (S606). The message output at operation S606 is distinguished from the power load warning message. The power load warning message is transmitted to all of the image processing apparatuses if power supplied through the network is overloaded. Meanwhile, the message output at operation S606 is a message notifying a user that the image processing apparatus performs the power saving function.

If it is not controlled to perform the power saving function at operation S604, the control process of the image processing apparatus 300 ends.

Figure 7:
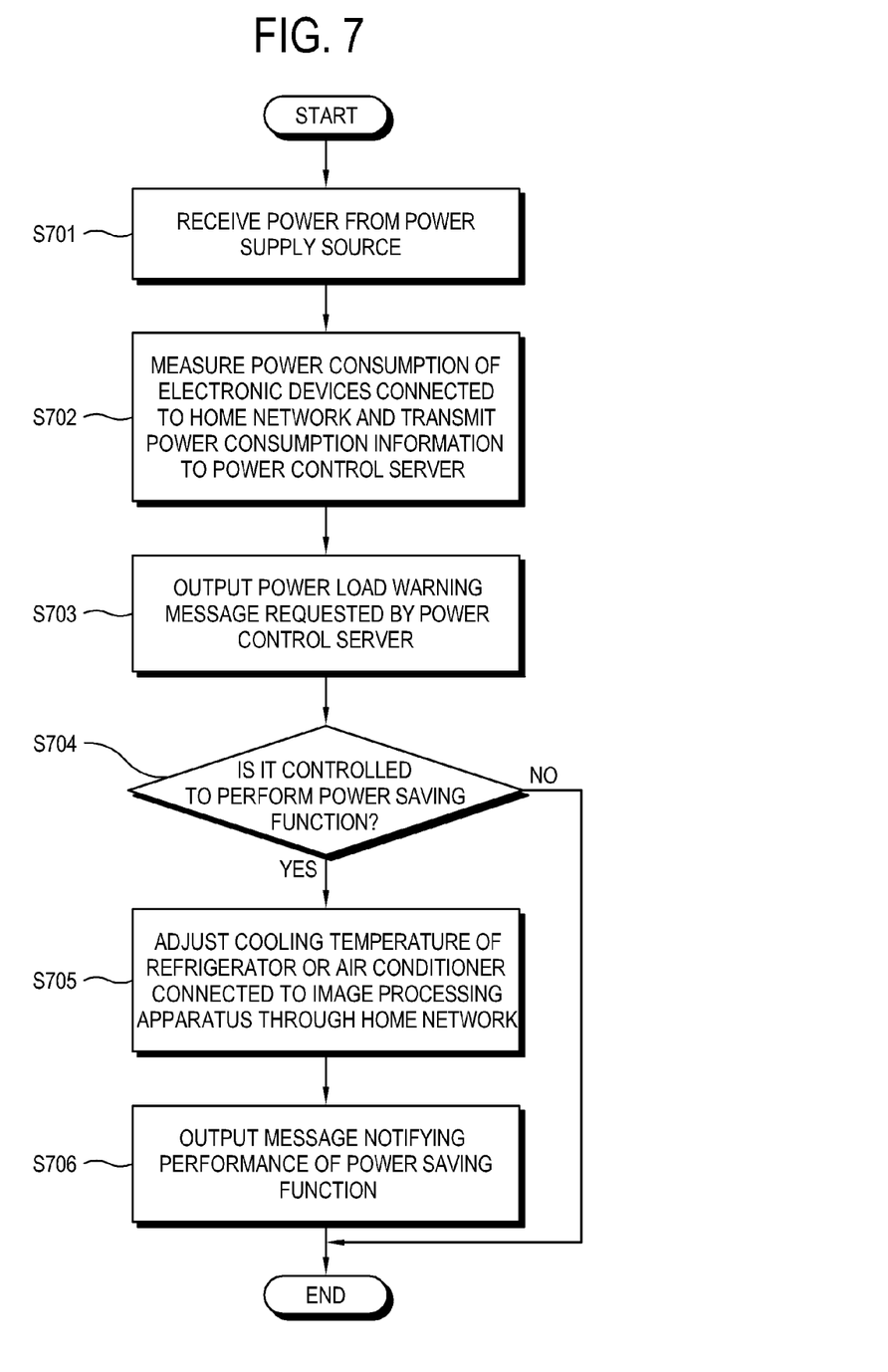
FIG. 7 is a flowchart of a control process of the image processing apparatus according to another exemplary embodiment of the present invention.

FIG. 7 is a flowchart of a control process of the image processing apparatus according to another exemplary embodiment of the present invention.

In the another exemplary embodiment, the image processing apparatus 300 may gradually lower a cooling level of a refrigerator and an air conditioner connected to the image processing apparatus 300 through the home network as well as controlling brightness, resolution and sound of its own. Further, the image processing apparatus 300 may control various electronic devices (e.g., illumination devices, a desktop computer, etc.) connected to the image processing apparatus 300 through the home network to perform the power saving function.

The image processing apparatus 300 is supplied power from the power supply source (S701). The image processing apparatus 300 measures the power consumption of the electronic devices connected to the home network, and transmits the power consumption information to the power control server 110 (S702).

If the power control server 110 requests to output the power load warning message, the image processing apparatus 300 outputs the message to the screen (S703).

The image processing apparatus 300 determines whether it is controlled to perform the power saving function (S704). If it is controlled to perform the power saving function, the image processing apparatus 300 may lower the cooling level of the refrigerator or the air conditioner connected to the image processing apparatus 300 through the home network (S705). If the cooling level is lowered, a target cooling temperature rises. If the target cooling temperature exceeds the specific temperature, the image processing apparatus 300 may not perform the power saving function.

If the power saving function is performed, the image processing apparatus 300 outputs the message notifying the performance of the power saving function (S706).

According to the exemplary embodiment, if the image processing apparatus 300 is controlled by the power control server 110 to perform the power saving function, the image processing apparatus 300 may control other electronic devices to perform the power saving function instead of performing the power saving function on its own.

According to the exemplary embodiments of the present invention, if an overall network requires much power, an image processing apparatus connected to the network performs a power saving function instead of operation of a power plant, which has high costs of power generation. Thus, while operation rate of the power plant having high costs is lowered, low carbon emission of the plant may be achieved and a user of the image processing apparatus may reduce power consumption by performing a power saving function.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
   an image processor which processes and displays an image signal;
   a communication unit which transmits power consumption of the image processing apparatus to a power control server, and is operable to receive a message indicating a power saving function from the power control server; and
   a controller, wherein if the message indicating the power saving function is received based on a first comparison of the power consumption with a first critical value, the controller controls the image processor to display a power load warning message and performs the power saving function in response to the power load warning message based on a second comparison of the power consumption with a second critical value,
   wherein the first comparison is a comparison between a total power consumption of a plurality of image processing apparatuses and the first critical value and the second comparison is a comparison between each of the plurality of the image processing apparatuses and the second critical value.

2. The image processing apparatus according to claim 1, wherein the controller controls the image processor to adjust at least one of brightness, resolution and sound of a displayed image if the power saving function is performed.

3. The image processing apparatus according to claim 2, wherein the controller controls the image processor to gradually lower the brightness or the sound of the displayed image.

4. The image processing apparatus according to claim 1, wherein the controller controls the image processor to output a message indicating a performance of the power saving function if the power saving function is performed.

5. The image processing apparatus according to claim 1, wherein the power consumption comprises power consumed by a home network comprising the image processing apparatus.

6. The image processing apparatus according to claim 1, wherein the controller controls the image processing apparatus or electronic devices connected to a home network to perform the power saving function.

7. The image processing apparatus according to claim 1, further comprising a measuring unit which measures the power consumption of the image processing apparatus.

8. The image processing apparatus according to claim 1, wherein the controller performs the power saving function depending on control information received from the power control server, provides a user interface (UI) related to the power saving function and performs the power saving function according to a user's input received through the UI.

9. The image processing apparatus according to claim 1, wherein the power load warning message comprises a warning message indicating a danger related to power supply or a warning message giving advance notice that the power saving function is to be performed.

10. The image processing apparatus according to claim 1, wherein the power consumption is in watts.

11. The image processing apparatus according to claim 1, wherein the power control server supplies power to a plurality of the image processing apparatuses.

12. The image processing apparatus according to claim 11, wherein the image processing apparatus measures its own power consumption and transmits the measured consumption information to the power control server.

13. The image processing apparatus according to claim 11, wherein the image processing apparatuses are connected to a network.

14. The image processing apparatus according to claim 1, wherein the first critical value is set on the basis of maximum power value available by a network, a power load of the network and the total power consumption and the second critical value is power required to operate the image processing apparatus.

15. A control method of an image processing apparatus, the control method comprising:
   transmitting power consumption of the image processing apparatus to a power control server;
   if a message for a power saving function is received from the power control server based on a first comparison of the power consumption with a first critical value, displaying a power load warning message and performing the power saving function corresponding to the power load warning message based on a second comparison of the power consumption with a second critical value; and
   processing and displaying an image signal, wherein the first comparison is a comparison between a total power consumption of a plurality of image processing apparatuses and the first critical value and the second comparison is a comparison between each of the plurality of the image processing apparatuses and the second critical value.

16. The control method according to claim 15, wherein if the power saving function is performed, at least one of brightness, resolution and sound of a displayed image signal is controlled.

17. The control method according to claim 16, wherein the brightness or the sound of the displayed image signal is gradually lowered.

18. The control method according to claim 15, wherein if the power saving function is performed, a message indicating a performance of the power saving function is output.

19. The control method according to claim 15, wherein the power consumption comprises power consumed by a home network comprising the image processing apparatus.

20. The control method according to claim 15, wherein the image processing apparatus or electronic devices connected to a home network are controlled to perform the power saving function.

21. The control method according to claim 15, further comprising measuring the power consumption of the image processing apparatus.

22. The control method according to claim 15, further comprising performing the power saving function depending on control information received from the power control server, providing a user interface (UI) related to the power saving function and performing the power saving function depending on a user's input received through the UI.

23. The control method according to claim 15, wherein the power load warning message comprises a warning message indicating a danger related to power supply or a warning message giving advance notice to perform the power saving function.

24. The control method according to claim 15, wherein the power consumption is in watts.

25. The control method according to claim 15, wherein the power control server supplies power to a plurality of the image processing apparatuses.

26. The control method according to claim 25, wherein the image processing apparatus measures its own power consumption and transmits the measured consumption information to the power control server.

27. The control method according to claim 25, wherein the image processing apparatuses are connected to a network.

28. The control method according to claim 15, wherein the first critical value is set on the basis of maximum power value available by a network, a power load of the network and the total power consumption and the second critical value is power required to operate the image processing apparatus.

29. An image processing apparatus comprising:
an image processor which processes and displays an image signal;
a communication unit which transmits power consumption of the image processing apparatus to a power control server, and is operable to receive a message indicating a power saving function from the power control server; and
a controller, wherein if the message indicating the power saving function is received, the controller controls the image processor to display a power load warning message and performs the power saving function in response to the power load warning message,
wherein the controller controls the image processor to adjust at least one of brightness, resolution and sound of a displayed image if the power saving function is performed, and
wherein the controller does not perform the power saving function if the brightness or the sound of the displayed image is lower than a specific level.

30. A control method of an image processing apparatus, the control method comprising:
transmitting power consumption of the image processing apparatus to a power control server;
if a message for a power saving function is received from the power control server, displaying a power load warning message and performing the power saving function corresponding to the power load warning message; and
processing and displaying an image signal,
wherein if the power saving function is performed, at least one of brightness, resolution and sound of a displayed image signal is controlled, and
wherein the power saving function is not performed if the brightness or the sound of the displayed image signal is lower than a specific level.

31. An image processing apparatus comprising:
an image processor which processes and displays an image signal;
a communication unit which transmits power consumption of the image processing apparatus to a power control server, and is operable to receive a message indicating a power saving function from the power control server; and
a controller, wherein if the message indicating the power saving function is received, the controller controls the image processor to display a power load warning message and performs the power saving function in response to the power load warning message
wherein the controller controls the image processor to adjust a value of display output of a displayed image if the power saving function is performed, and the controller does not perform the power saving function if the value of display output of the displayed image is lower than a specific value.

32. A control method of an image processing apparatus, the control method comprising:
transmitting power consumption of the image processing apparatus to a power control server;
if a message for a power saving function is received from the power control server, displaying a power load warning message and performing the power saving function corresponding to the power load warning message; and
processing and displaying an image signal,
wherein if the power saving function is performed, a value of display output of a displayed image is adjusted, and the power saving function is not performed if the value of display output of the displayed image is lower than a specific value.

* * * * *